UNITED STATES PATENT OFFICE.

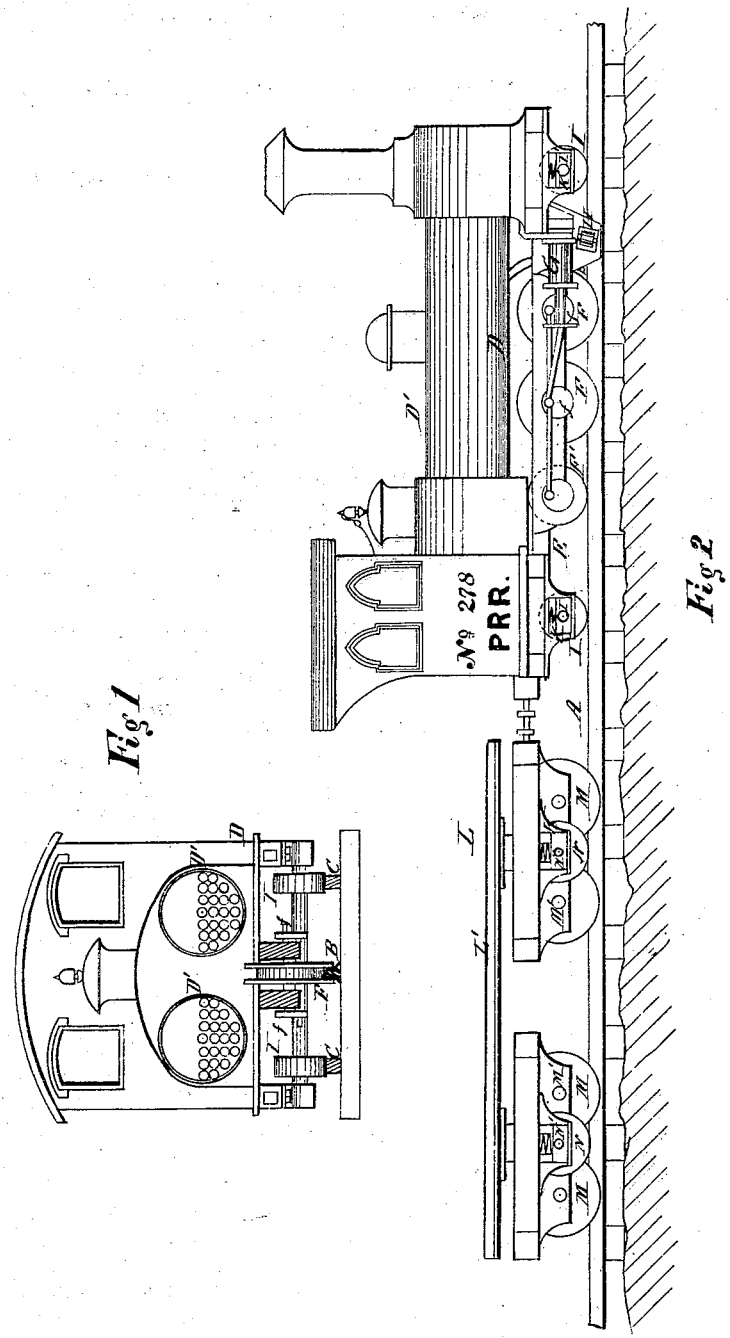

ROBERT McCULLY, OF PHILADELPHIA, PENNSYLVANIA, ASSIGNOR OF ONE-HALF HIS RIGHT TO OSBORN CONRAD, OF SAME PLACE.

IMPROVEMENT IN RAILWAY-TRUCKS AND LOCOMOTIVES.

Specification forming part of Letters Patent No. 153,097, dated July 14, 1874; application filed March 7, 1874.

*To all whom it may concern:*

Be it known that I, ROBERT MCCULLY, of Philadelphia, in the county of Philadelphia and State of Pennsylvania, have invented a certain new and useful Improvement in Single-Rail Railroads; and I do hereby declare the following to be a full, clear, and exact description of the invention, such as will enable others skilled in the art to which it pertains to make and use it, reference being had to the accompanying drawings, which form part of this specification, in which—

Figure 1 is a vertical transverse section, and Fig. 2 a side elevation, of my invention.

This invention has relation to railroads the rolling-stock of which are adapted to run on a single rail; and it consists in the novel construction of the engine and cars or trucks, and in the combination, with a single main rail and two auxiliary rails, of an engine, car, or truck having central and auxiliary or guard wheels, said rails and wheels being so arranged relatively that when the engine, car, or truck is in motion on a straight line the same will be supported upon the center or main rail only; while when it is at rest, or running upon curves, it will be supported upon said central or main rail and one of the guiding-rails, all as hereinafter more fully described.

Referring to the accompanying drawings, A represents the road upon which the engine and cars are to run; B being the bearing-rail, and C C balance-rails—these several rails being laid upon sleepers and ties in the usual or any suitable manner. The bearing-rail B will be made of iron or steel, while the balance-rails may be made of wood or metal, preferably of the latter if there be much travel on the road. D represents the engine, which is formed with twin boilers D' D', heated from a single furnace, E. F F are driving-wheels, grooved substantially as shown, located in the middle of the engine, and working between the boilers D' D'. G are cylinders, the pistons of which are connected with the axle of the driving-wheels F F through the medium of the disks *f f*, or equivalent wheels. F' is a third driving-wheel with a plain periphery or rim, located in the rear of the wheels F, and bearing upon the same rail B. H are friction-rollers, arranged in suitable frames in front of the driving-wheels, and designed to take up the side friction on the rails. These rollers are inclined slightly forward at the top, by which means, on the forward motion of the engine, their tendency is to draw said engine down to the bearing-rail and prevent its jumping therefrom. I I are balance-wheels, one pair of which is located on the front part of the engine, and the other at the rear.

The wheels I I, it will be observed, have plain faces or tires, and are merely intended to balance the engine when stationary, or to support one side of it in going around curves. Their axles I' I' have their bearings in spring-boxes K K, which yield readily on going around curves, so as to keep said axles and the boilers always in a horizontal position. L represents a truck or car designed to be run upon my improved road. L' is the body, and M M the grooved bearing-wheels, located in the middle and running upon the track B. N N are balance-wheels, similar to those upon the engine. These balance-wheels may be either fast or loose upon the axles N' N', which have spring-bearings similar to the axles I' I'. Instead of locating and arranging the wheels N N upon axles N' N', as shown, the axles M' M' of the bearing-wheels M may be extended as far as the rails C C, and said balance-wheels placed upon them. In this case the balance-wheels, of course, must run loosely upon their axle, which will be provided with spring-bearings, as above described.

By making the balance-wheel with a plain face, I am enabled to have a shorter curve than if it were flanged like the wheel F F; but I do not limit myself to its arrangement in the rear of the said wheels F F, for the reason that in a single-track railway it may be located between said wheels and still produce the same result.

I am aware that there is no novelty in a railroad having the track and rolling-stock so constructed that the latter will run upon a single main rail located between auxiliary rails or their equivalents. I therefore do not claim, broadly, the feature of said railroad; but, Having fully described my invention, I claim—

1. In a locomotive-engine adapted to run upon a single main rail, central grooved driving-wheels, in combination with twin boilers for equalizing the weight of the engine, substantially as described.

2. An engine, car, or truck provided with central grooved wheels and guard-wheels at the sides, in combination with the track comprising a central or main rail and guard-rails, substantially as and for the purpose specified.

In testimony that I claim the foregoing I have hereunto set my hand this 3d day of March, 1874.

ROBERT McCULLY.

Witnesses:
 THOS. A. CONNOLLY,
 EUGÈNE P. EADSON.